(12) United States Patent
Harel et al.

(10) Patent No.: US 7,430,309 B2
(45) Date of Patent: Sep. 30, 2008

(54) COMPUTATION OF A GEOMETRIC PARAMETER OF A CARDIAC CHAMBER FROM A CARDIAC TOMOGRAPHY DATA SET

(75) Inventors: François Harel, Montreal (CA); Vincent Finnerty, Montreal (CA)

(73) Assignee: Institut de Cardiologie de Montreal, Montreal (CA)

( * ) Notice: Subject to any disclaimer, the term of this patent is extended or adjusted under 35 U.S.C. 154(b) by 730 days.

(21) Appl. No.: 11/052,077

(22) Filed: Feb. 8, 2005

(65) Prior Publication Data
US 2005/0201598 A1 Sep. 15, 2005

Related U.S. Application Data

(60) Provisional application No. 60/542,285, filed on Feb. 9, 2004.

(51) Int. Cl.
*G06K 9/00* (2006.01)
(52) U.S. Cl. .............. 382/128; 378/4; 378/901
(58) Field of Classification Search .......... 382/128, 382/129, 130, 131, 132, 133, 134; 378/4, 378/21, 22, 23, 24, 25, 26, 27, 46, 90, 92, 378/98.4, 98.6, 101, 140, 901; 600/16, 324, 600/450, 479, 481, 483, 513; 250/363.04, 250/370.09; 424/9.4
See application file for complete search history.

(56) References Cited

U.S. PATENT DOCUMENTS

| | | |
|---|---|---|
| 5,239,591 A | 8/1993 | Ranganath |
| 5,365,429 A | 11/1994 | Carman |
| 5,433,199 A | 7/1995 | Cline |
| 5,540,850 A | 7/1996 | Foster |
| 5,859,891 A | 1/1999 | Hibbard |
| 6,064,768 A | 5/2000 | Hajj et al. |
| 6,246,784 B1 | 6/2001 | Summers et al. |
| 6,249,693 B1 | 6/2001 | Cline |
| 6,628,743 B1 | 9/2003 | Drummond et al. |

(Continued)

FOREIGN PATENT DOCUMENTS

EP  1 013 225 A1  6/2000

(Continued)

OTHER PUBLICATIONS

Veronique Eder & al. Three-Dimensional Analysis of Left . . . Nuclear Medicine Communications Sep. 2004, pp. 971-978 vol. 25 No. 9 France.

(Continued)

*Primary Examiner*—Samir A. Ahmed
*Assistant Examiner*—Mehdi Rashidian

(57) ABSTRACT

A method for extracting a geometric parameter from a cardiac tomography data set. The method includes providing a cardiac tomography data set and a region of interest, computing an approximative model of a surface of interest, computing a plurality of normal vectors associated with a respective surface coordinate from the approximative model of the surface of interest, computing a plurality of biopsy data sets, each biopsy data set being oriented along a respective normal vector from the plurality of normal vectors, computing an exact model of the surface of interest from the plurality of biopsy data sets, and computing the geometric parameter on a basis of the exact model of the surface of interest.

27 Claims, 3 Drawing Sheets

U.S. PATENT DOCUMENTS

| | | | |
|---|---|---|---|
| 6,721,450 | B2 | 4/2004 | Tannenbaum et al. |
| 6,757,414 | B1 | 6/2004 | Turek et al. |
| 2002/0172407 | A1* | 11/2002 | O'Donnell et al. .......... 382/131 |
| 2003/0053667 | A1 | 3/2003 | Paragios et al. |
| 2004/0024315 | A1 | 2/2004 | Chalaba et al. |
| 2004/0175034 | A1 | 9/2004 | Wiemker et al. |
| 2004/0197015 | A1 | 10/2004 | Fan et al. |

FOREIGN PATENT DOCUMENTS

WO     WO 2004/097720 A1     11/2004

OTHER PUBLICATIONS

Martin Penincka & al. Improvement of Left Ventricular Function . . . Circulation 2004, Mar. 2004 pp. 978-983 vol. 109 Belgique.

Laurent Fauchier & al. Interventricular and Intraventricular Dyssynchrony . . . Journal of the American College of Cardio. Nov. 11, 2002 pp. 2022-2030 vol. 40 USA.

Danielle Casset-Senon & al. Fourier Phase Analysis of Spect Equilibrim . . . Journal of Nuclear Cardiology Sep. 2000 pp. 471-477 France.

Elias H. Botvinick. Scintigraphic Blood Pool and Phase Image Analysis . . . Journal of Nuclear Cardiology Jul. 2003 pp. 424-428 vol. 10 No. 4 USA.

Didier Vilain & al. Optimal 3-Dimensional Method of Right and Left Ventricular . . . Journal of Nuclear Cardiology May 2001 pp. 371-378 vol. 8 No. 3 USA.

Andre Neubauer & al. Analysis of Four-Dimensional Cardiac . . . Journal of WSCG Feb. 2003 vol. 11 No. 1 pp. 1213-1220 Czech Republic.

* cited by examiner

COMPUTATION OF A GEOMETRIC PARAMETER OF A CARDIAC CHAMBER FROM A CARDIAC TOMOGRAPHY DATA SET

This application claims priority from U.S. Provisional Patent Applications Ser. No. 60/542,285 filed Feb. 9, 2004.

FIELD OF THE INVENTION

The present invention relates to the art of tomography data sets processing. More specifically, the present invention is concerned with the computation of a geometric parameter of a cardiac chamber from a cardiac tomography data set.

BACKGROUND OF THE INVENTION

Many geometric parameters related to cardiac chambers of a patient are of interest to clinicians. Specific examples of such geometric parameters include surface coordinates and cavity volume at specific moments in the cardiac cycle, ejection fraction and phase differences between data relating to two distinct cardiac chambers or to different parts of a specific cardiac chamber, among others. Many of these parameters can be estimated further to the computation of a suitable model of a surface of one or more cardiac chambers. Typically, the model includes a plurality of surface coordinate tri-dimensional vectors.

While the present document refers to cardiac chambers of a patient, it is to be understood that the patient is not necessarily a human suffering from a pathology or from symptoms of a pathology. For example, the patient could be a normal non-pathologic human subject undergoing a preventive diagnostic procedure, an athlete undergoing a study aiming to improve athletic performance, a human subject participating in a research protocol or an animal, among others. However, for brevity, it will be assumed herein after that the patient is a human subject who is not necessarily suffering from a pathology.

A specific example of a prior art method for computing a model of the surface of a cardiac chamber involves the segmentation of a cardiac tomography data set, the cardiac tomography data set including a plurality of voxels. A voxel is an equivalent of a pixel for multi-dimensional data. Accordingly, a voxel includes an intensity value and a tri-dimensional position vector. An objective of the segmentation process is to delimitate physically significant regions in the cardiac tomography data set. In the case discussed herein, segmentation is directed to the delimitation of a cardiac chamber of interest through the computation of a model of a surface of interest, the surface of interest delimitating the cardiac chamber of interest. Many methods for computing a model of the surface of the cardiac chamber of interest from a cardiac tomography data set have been proposed, but they are mostly unsatisfactory.

In a first prior art method for computing a model of the surface of the cardiac chamber, a user manually identifies regions of interest on bi-dimensional slices in the cardiac tomography data set. The regions of interest are regions on each bi-dimensional slice corresponding to the cardiac chamber of interest. The model of the surface of the cardiac chamber of interest includes voxel coordinates of the voxels peripheral to the voxels selected on each slice. A disadvantage of this method resides in a strong dependency on the user. Accordingly, the models of the surface of the cardiac chamber of interest produced by different users will not be identical and are highly likely to be imprecise.

In a second method for computing a model of the surface of the cardiac chamber, referred to as the Germano-type method and described in detail in Van Kriekinge et al., Automatic quantification of left ventricular ejection fraction from gated blood pool SPECT, Journal of Nuclear Cardiology, 1999, Vol. 6, pp 498-506, an ellipsoid is fitted to voxels from the cardiac tomography data set representative of a cardiac chamber of interest. The cardiac tomography data set is acquired using a single photon emission computed tomography (SPECT) imaging apparatus further to an injection in a patient of a radioactive substance. The general location of the cardiac chamber of interest, and therefore of the voxels used for the fit, can be identified in the cardiac tomography data set by a user or through the use of heuristic methods, among others.

Subsequently, a plurality of biopsy data sets are computed. Each biopsy data set includes a plurality of data points and is representative of a plurality of voxels oriented in a direction of a respective ray originating at a centre of the ellipsoid. Each biopsy data set is numerically differentiated once and twice to provide respective first and second derivatives data sets. Then, a complex algorithm is used to fit a surface to candidate surface points computed from the first derivative data set. Since it has been shown that the surface of the cardiac chamber is located on a given profile at a location close to a minimum of the first derivative data set, each candidate data points is located at a minimum of a respective first derivative data set. Subsequently, the fitting procedure is used to fit a surface to the candidate data points, each candidate data point having a weight depending on a local maximum of the second derivative data set. Further details regarding the fitting procedure can be found in the above-referenced article by Van Kriekinge et al.

The Germano-type method presents two major deficiencies. First, since the ventricle is not an ellipsoid, some rays will not be perpendicular to the real surface of the cavity to model. Therefore, uncertainties in the exact location of the surface will be introduced in the model of the surface of the cardiac chamber of interest. In addition, since the exact location of the surface is not necessarily at a minimum of the first derivative data set it is very likely that errors are incorporated in the model of the surface of the cardiac chamber of interest.

In conclusion, currently available models of the surface of interest are error-prone due to deficiencies inherent to the segmentation methods currently used. Accordingly, any parameter estimated from these models will also be erroneous. Therefore, there is a need in the industry to provide novel methods and apparatuses to compute a geometric parameter of a cardiac chamber from a cardiac tomography data set.

In addition, a clinician might be interested in gaining information related to a synchronization of contraction between different portions of a heart. For example, a criterion used currently by clinicians to indicate a lack of synchronization between a contraction of a left ventricle and a contraction of a right ventricle is the presence of a widened QRS complex in an electrocardiogram. However, many other causes of such a widened QRS complex exist, which makes this criterion non-specific.

Accordingly, there is a need in the industry to provide novel methods and apparatuses to measure a synchronization of contraction between different portions of a heart.

The present description refers to a number of documents, the content of which is herein incorporated by reference in their entirety.

OBJECTS OF THE INVENTION

An object of the present invention is therefore to provide an improved method and apparatus for the computation of a geometric parameter of a cardiac chamber from a cardiac tomography data set.

SUMMARY OF THE INVENTION

In a first broad aspect, the invention provides a method for extracting a geometric parameter from a cardiac tomography data set. The method includes the steps of:

- providing a cardiac tomography data set including a plurality of voxels, each voxel including a respective tri-dimensional position vector and a respective intensity value;
- providing a region of interest including a plurality of voxels selected from the cardiac tomography data set, the region of interest including at least in part voxels from the cardiac tomography data set representative of a cardiac chamber of interest, the cardiac chamber of interest having a surface of interest;
- computing an approximative model of the surface of interest on a basis of the region of interest using a non-parametric method, the approximative model of the surface of interest including a plurality of surface coordinates tri-dimensional vectors;
- computing a plurality of normal vectors, each normal vector being associated with a respective surface coordinate from the approximative model of the surface of interest;
- computing a plurality of biopsy data sets, each biopsy data set including a plurality of data points, each biopsy data set being representative of a plurality of voxels oriented in a direction defined by a respective normal vector selected from the plurality of normal vectors and including the surface coordinate associated with the respective normal vector;
- computing an exact model of the surface of interest on a basis of the plurality of biopsy data sets, the exact model of the surface of interest including a plurality of surface coordinates tri-dimensional vectors, the exact model of the surface of interest being computed by expanding locally the approximative model of the surface of interest in directions defined by the plurality of normal vectors; and
- computing the geometric parameter on a basis of at least one surface coordinate from the plurality of surface coordinates included in the exact model of the surface of interest.

Voxels represent data acquired by a tomography imaging apparatus. Each voxel includes a tri-dimensional position vector and an intensity value. In a specific example of implementation, the tri-dimensional position vector is implicit in the form of three indices related to a position in a multi-dimensional table. In a further specific example of implementation, the tri-dimensional position vector is explicit in the form of a list of three numbers. The intensity value represents a measurement taken by the tomography imaging apparatus in a volume corresponding to a location in a patient associated with the tri-dimensional position vector. It is to be understood that the intensity value is not necessarily an intensity in the physical meaning of the term and can represent any parameter measured by the tomography imaging apparatus. For example, and non-limitatively, the intensity value might be representative of a phase measured by a magnetic resonance imaging apparatus. In some embodiments of the invention, the voxel includes a time data. The time data is indicative of a time at which the measurement has been taken by the tomography imaging apparatus. In a specific example of implementation, the time data is indicative of a phase or a time in a cardiac cycle. The time data may be explicit in the form of a number or implicit in the form of an index in a multi-dimensional table.

The region of interest is selected manually by a user or through an automated procedure. The region of interest serves as a seed for computing an approximative model of the surface of interest. The surface of interest is the surface of a cardiac chamber, such as, for example, the surface of a ventricle or an auricle.

In a specific example of implementation, the step of computing an exact model of the surface of interest on a basis of the plurality of biopsy data sets by expanding locally the approximative model of the surface of interest in directions defined by the plurality of normal vectors includes expanding locally the approximative model of the surface of interest until an optimization criterium is satisfied.

A very specific and non-limiting example of such an optimization criterion in a multiresolution laplacian variance minimization. When the multiresolution laplacian variance minimization is used, each of the biopsy data set is representative the variance of a multiresolution laplacian data set at a plurality of voxels oriented in a direction defined by a respective normal vector selected from the plurality of normal vectors and including the surface coordinate associated with the respective normal vector. The exact model of the portion of the surface of interest includes a plurality of surface coordinates tri-dimensional vectors at which the variance of the multiresolution laplacian data set is substantially minimal.

The geometric parameter computed on a basis of at least one surface coordinate from the plurality of surface coordinates included in the exact model of the surface of interest is a parameter related to one or more cardiac chambers of interest. Specific examples of geometric parameters include, but are not limited to, surface coordinates and cavity volume at specific moments in the cardiac cycle, ejection fraction and phase difference between data relating to two distinct cardiac chambers or to different parts of a unique cardiac chamber.

In another broad aspect, the invention provides a computer readable storage medium containing a program element for execution by a computing device. The program element is operative for extracting a geometric parameter from a cardiac tomography data set.

In some embodiments of the invention, a method for computing a Fourier coefficient indicative of a degree of synchronization between a contraction of two different portions of a heart is implemented. The Fourier coefficient is obtained through a Fourier analysis applied to a geometric parameter extracted from a cardiac tomography data set. The Fourier coefficient includes one or more components selected from of a phase, an amplitude or a power.

In some embodiments of the invention, the invention implements a method for classifying patients as good or bad candidates for the implantation of a bi-electrode pacemaker. A bi-electrode pacemaker includes two electrodes implanted in two different portions of a heart. In a specific example of implementation, a good candidate for the implantation of a bi-electrode pacemaker suffers from a pathologic lack of synchronization in a contraction of a left and a right ventricles. In a very specific example of implementation, a good candidate for the implantation of a bi-electrode pacemaker experiences a phase difference in the contraction of the left and the right ventricles larger than a predetermined phase. The phase difference in the contraction of the left and the right ventricles can be computed from a Fourier analysis of an exact model of surfaces of the right and left ventricles.

The invention further provides a method for adjusting a delay between a stimulation of a left and a right ventricles by a bi-electrode pacemaker implanted in a patient. One electrode stimulates the left ventricle and another electrode stimulates the right ventricle. The delay is adjusted to restore a synchronization between a contraction of the right and the left ventricles. The synchronization between the contraction of the right and left ventricles can be evaluated through the computation of an exact model of the right and left ventricles from a cardiac tomography data set. In a specific example of implementation, the delay is gradually modified until the synchronization between the contraction of the right and left ventricles are satisfactory.

The invention further provides a method for performing a segmentation of a multi-dimensional data set. The method includes steps of:

providing a multi-dimensional data set including a plurality of voxels, each voxel including a respective multi-dimensional position vector and a respective intensity value;

providing a region of interest including a plurality of voxels selected from the multi-dimensional data set, the region of interest defining a surface of interest;

computing an approximative model of the surface of interest on a basis of the region of interest using a non-parametric method, the approximative model of the surface of interest including a plurality of surface coordinates multi-dimensional vectors;

computing a plurality of normal vectors, each normal vector being associated with a respective surface coordinate from the approximative model of the surface of interest;

computing a plurality of biopsy data sets, each biopsy data set including a plurality of data points, each biopsy data set being representative of a plurality of voxels oriented in a direction defined by a respective normal vector selected from the plurality of normal vectors and including the surface coordinate associated with the respective normal vector, computing a plurality of biopsy data sets including computing a multiresolution laplacian data set from the multi-dimensional data set, each of the biopsy data set being representative of the variance of the multiresolution laplacian data set at a plurality of voxels oriented in a direction defined by a respective normal vector selected from the plurality of normal vectors and including the surface coordinate associated with the respective normal vector; and computing an exact model of at least a portion of the surface of interest on a basis of the plurality of biopsy data sets, the exact model of the portion of the surface of interest including a plurality of surface coordinates multi-dimensional vectors, the exact model of the portion of the surface of interest being computed by expanding locally the approximative model of the surface of interest in directions defined by the plurality of normal vectors, the exact model of the portion of the surface of interest including a plurality of surface coordinates multi-dimensional vectors at which the variance of the multiresolution laplacian data set is substantially minimal.

Other objects, advantages and features of the present invention will become more apparent upon reading of the following non-restrictive description of preferred embodiments thereof, given by way of example only with reference to the accompanying drawings.

DETAILED DESCRIPTION

The invention relates to a method for extracting a geometric parameter from a multi-dimensional data set. A non-limiting example of such a data set is a tri-dimensional cardiac tomography data set. In this example, the method includes providing a cardiac tomography data set and a region of interest, computing an approximative model of a surface of interest, computing a plurality of normal vectors associated with a respective surface coordinate from the approximative model of the surface of interest, computing a plurality of biopsy data sets, each biopsy data set being oriented along a respective normal vector from the plurality of normal vectors, computing an exact model of the surface of interest from the plurality of biopsy data sets, and computing the geometric parameter on a basis of the exact model of the surface of interest.

The approximative model serves as a seed for the computation of the exact model and takes into account the geometry of the cardiac chamber so that local deformations of the approximative model lead to the exact model. The exact model is automatically computed so as to satisfy an optimization criteria. Then, the exact model is used to compute the geometric parameter.

In an embodiment of the invention, the geometric parameter provides a classification criterion for classifying patients as good or bad candidates for the implantation of a bi-electrode pacemaker. The geometric parameter is also usable for adjusting a delay between a stimulation of a left and a right ventricles by the bi-electrode pacemaker implanted in a patient. However, in other embodiments of the invention, the geometric parameter is used in any other suitable manner.

More generally, the multi-dimensional data set is any suitable data set within which a surface of interest is sought through segmentation. The number of dimensions of the data set is any suitable number of dimensions, such as two dimensions and three dimensions, among others. For example, the multi-dimensional data set is a medical imaging data set representative of a subject within which a surface of an organ or of a portion of an organ is sought. However, it is within the scope of the invention to have any other suitable multi-dimensional data set.

The method is described herein below with respect to non-limiting example wherein the multi-dimensional data set includes a tri-dimensional cardiac tomography data set. However, the use of this specific example is selected to help understand the method in the context of a specific application and should not be used to restrict the scope of the appended claims.

Figure 1:
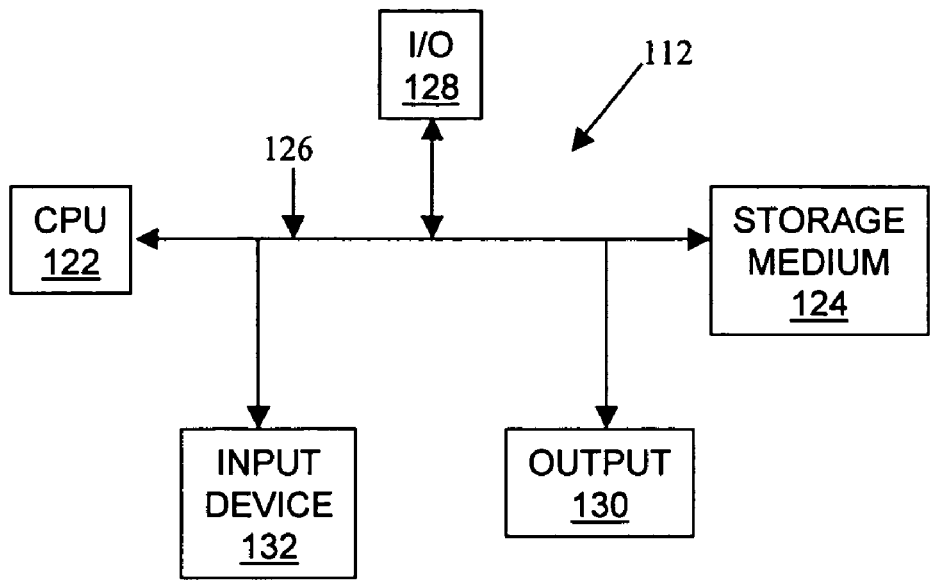
FIG. 1 is a block diagram of an apparatus for computing a geometric parameter from a cardiac tomography data set.

FIG. 1 is a block diagram of an apparatus for computing a geometric parameter from a cardiac tomography data set in the form of a computing device 112. The computing device 112 includes a Central Processing Unit (CPU) 122 connected to a storage medium 124 over a data bus 126. Although the storage medium 124 is shown as a single block, it may include a plurality of separate components, such as a floppy disk drive, a fixed disk, a tape drive and a Random Access Memory (RAM), among others. The computing device 112 also includes an Input/Output (I/O) interface 128 that connects to the data bus 126. The computing device 112 communicates with outside entities through the I/O interface 128. In a non-limiting example of implementation, the I/O interface 128 is a network interface. In a further non-limiting example of implementation, the I/O interface is a port for exchanging electrical signals with a cardiac tomography imaging apparatus.

The computing device 112 also includes an output device 130 to communicate information to a user. In the example shown, the output device 130 includes a display. Optionally, the output device 130 includes a printer or a loudspeaker, among other suitable output device components. The computing device 112 further includes an input device 132 through which the user may input data or control the operation of a program element executed by the CPU 122. The input device 132 may include, for example, any one or a combination of the following: keyboard, pointing device, touch sensitive surface or speech recognition unit, among others.

When the computing device 112 is in use, the storage medium 124 holds a program element 200 (see FIG. 2) executed by the CPU 122, the program element 200 implementing a method for extracting a geometric parameter from a cardiac tomography data set.

Figure 2:
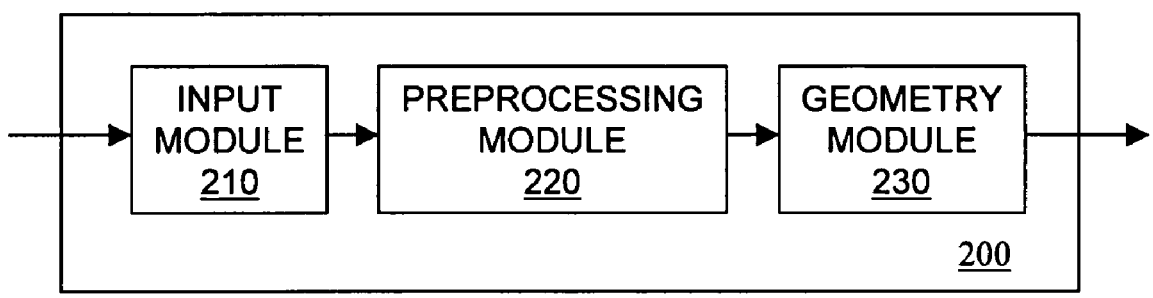
FIG. 2 is a block diagram of a specific example of implementation of a program element executed on the apparatus of FIG. 1.

FIG. 2 illustrates in block diagram form a specific example of implementation of the program element 200. The program element 200 includes an input module 210, a preprocessing module 220 and a geometry module 230. Arrows in FIG. 2 illustrate the flow of information in the program element 200.

The input module 210 accepts data in the form of a cardiac tomography data set and a region of interest. The input module then transmits the cardiac tomography data set and the region of interest to the preprocessing module 220, which computes an exact model of a surface of a cardiac chamber of interest. The exact model of the surface of the cardiac chamber of interest is then transmitted to the geometry module 230. The geometry module 230 computes and releases a geometric parameter, which is a one-dimensional or a multi-dimensional geometric parameter.

The input module 210 is provided for receiving a cardiac tomography data set and a region of interest. The cardiac tomography data set includes a plurality of voxels, each voxel including a respective tri-dimensional position vector and a respective intensity value. In some embodiments of the invention, each voxel includes also a time data, such as a time stamp. The region of interest includes a plurality of voxels selected from the cardiac tomography data set. Specifically, the region of interest includes at least in part voxels from the cardiac tomography data set representative of a cardiac chamber of interest, the cardiac chamber of interest having a surface of interest.

In a very specific example of implementation, the cardiac tomography data set is acquired by an imaging apparatus and transferred to the input module 210 through the I/O interface 128, which is in a data communication relationship with the imaging apparatus. Alternatively, the cardiac tomography data set is contained in the storage medium 124 and recovered therefrom by the input module 210.

Examples of an imaging apparatus suitable for providing the cardiac tomography data are: a single photon emission tomography (SPECT) apparatus; a positron emission tomography (PET) apparatus; a tridimensional echography apparatus, a tridimensional Doppler ultrasound apparatus; a tridimensional angiography apparatus; an electron beam computed tomography apparatus; an electrical impedance tomography apparatus; and a magnetic resonance imaging (MRI) scanner. In many instances, but not necessarily, the imaging apparatus performs an averaging procedure and the data used for producing the cardiac tomography data set is acquired over many cardiac cycles, for example to improve a signal-to-noise ratio. Therefore, in these instances, data acquisition needs to be synchronized by the imaging apparatus with electrocardiographic data. A method for acquiring such a type of cardiac tomography data is described in more details in U.S. Pat. No. 6,389,310 issued to Demonceau et al., but other suitable methods are also usable in conjunction with the invention.

The region of interest includes a plurality of voxels selected from the cardiac tomography data set. For example, the region of interest might be selected manually by a user through the input device 132. In a very specific example of implementation, the user is presented with a plurality of slices from the cardiac tomography data set, each slice including voxels located in a common plane. The user then operates a pointing device to define a portion of the region of interest on each slice. If the user is not presented with contiguous slices in the cardiac tomography data set, an optional interpolation algorithm might be executed by the input module 210 to provide the region of interest.

In another example, the region of interest is selected at least in part automatically by the input module 210. For instance, a known cardiac cavity identification method, such as for example a watershed-based method may be used to identify the cardiac chamber within the cardiac tomography data set and include within the region of interest all the voxels representing the cardiac chamber of interest.

In some embodiments of the invention, providing a cardiac tomography data set includes performing a coordinate system standardisation wherein the tri-dimensional position vector of each voxel is mapped to a standardised coordinate system. For example, the coordinate system standardisation is performed at least on a basis of a detection of a plane separating the ventricles from the atriums in the cardiac tomography data set. Therefore, in the standardised coordinate system, this plane is positioned to include an origin of the standardised coordinate system or in any other suitable coordinate system.

Figure 3:
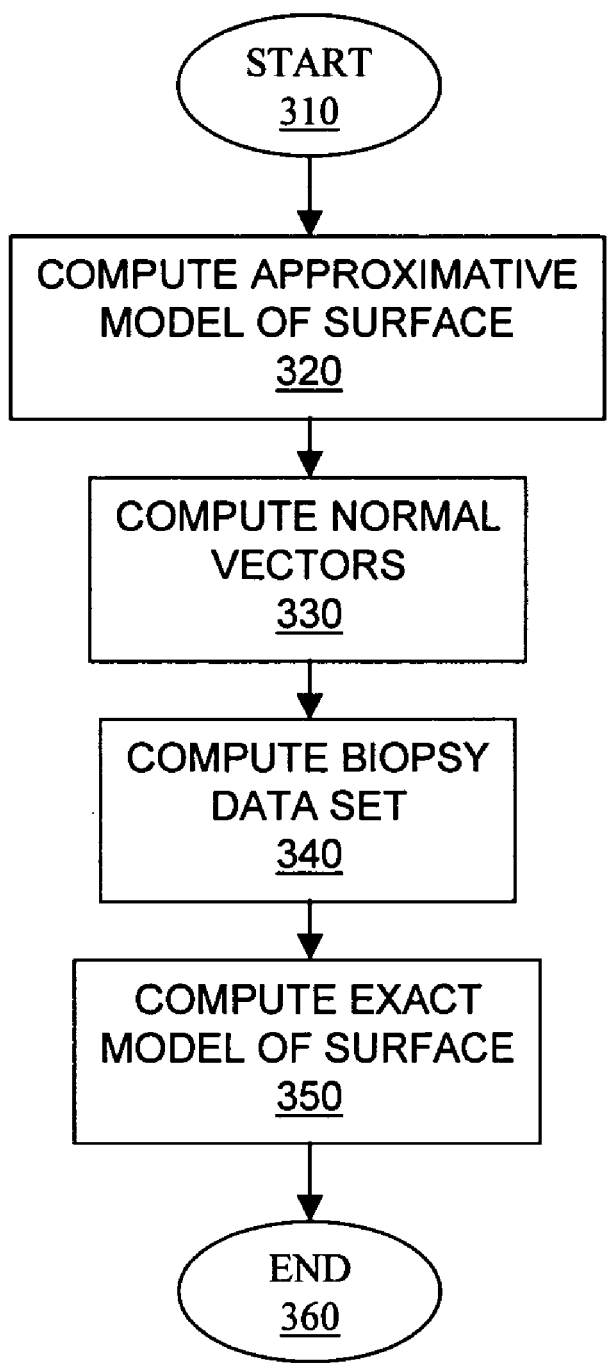
FIG. 3 is a flowchart illustrating a preprocessing method performed by a preprocessing module included in the program element of FIG. 2.

The preprocessing module 220 implements a preprocessing method for computing an exact model of the surface of interest. A specific example of implementation of the preprocessing method 300 is illustrated in FIG. 3.

At step 310, the preprocessing method begins. Subsequently, at step 320, the preprocessing module 220 computes an approximative model of the surface of interest. At step 330, the preprocessing module 220 computes a plurality of normal vectors associated with the approximative surface. The plurality of normal vectors defines a plurality of directions along which a plurality of biopsy data sets are computed at step 340. Finally, at step 350 an exact model of the surface of interest is computed on a basis of the plurality of biopsy data sets and the method ends at step 360.

The approximative model of the surface of interest computed at step 320 includes a plurality of surface coordinates, each being a tri-dimensional vector. The approximative model approximates the surface of interest and is computed on a basis of the region of interest using a non-parametric method. Non-parametric methods, in opposition to parametric methods, do not approximate the cardiac chamber by a simple geometric shape defined by a few parameters. For example, a parametric method could approximate a left ventricle by an ellipsoid, the ellipsoid being characterized by a centre and three principal axis dimensions and orientations.

In a specific example of implementation, the approximative model is obtained by continuously deforming the region of interest until the approximative model of the surface of interest surrounds a largest set of voxels having an intensity above a predetermined threshold. In other words, in this case the approximative model includes an isosurface.

An example of a predetermined threshold is a predetermined fraction of the maximal intensity of all the voxels contained within the region of interest. For example, the predetermined fraction of the maximal intensity is from about 0.2 times the maximal intensity to about 0.5 times the maximal intensity. In a specific example, the predetermined fraction of the maximal intensity is about 0.4 times the maximal intensity.

Another example of a threshold is a threshold that is modified by the user until a visual inspection of the approximative model is satisfactory. In yet another example, the threshold is a predetermined absolute value.

Optionally, a filter is applied to the cardiac tomography data set prior to the computation of the approximative model. Alternatively, and also optionally, a filter is applied to the approximative model to mitigate the effects of random variations inherent to the cardiac tomography data set acquisition process. Such filters are well known in the art and will therefore not be described in further details.

As mentioned herein above, the preprocessing module 220 computes at step 330 a plurality of normal vectors. Each normal vector is associated with a respective surface coordinate from the approximative model of the surface of interest. The plurality of normal vectors defines a plurality of directions locally perpendicular to the approximative model of the surface of interest.

The plurality of normal vectors is used at step 340 to compute a plurality of biopsy data sets, each biopsy data set including a plurality of data points. Each biopsy data set is representative of a plurality of voxels oriented in a direction defined by a respective normal vector selected from the plurality of normal vectors and including the surface coordinate associated with the respective normal vector.

In a specific example of implementation, each biopsy data set is computed as follows. First, a cylinder including a certain surface coordinate of the approximative surface model and oriented in the direction of the normal vector associated with the certain surface coordinate is built. As the reader skilled in the art will appreciate, the radius of the cylinder is selected on a basis of many factors, including but not limited to the resolution of the cardiac tomography data set and the noise level in the cardiac tomography data set. The cylinder includes a plurality of cylinder slices, each cylinder slice being associated with a respective data point included in the biopsy data set. The value of each data point is an average value of all the voxels contained within each associated cylinder slice.

In a further specific example of implementation, each biopsy data set is computed as follows. First, a line segment including a certain surface coordinate of the approximative surface model and oriented in the direction of the normal vector associated with the certain surface coordinate is built. The segment includes a plurality of data locations, each data location being associated with a respective data point included in the biopsy data set. The value of each data point is obtained by interpolating the cardiac tomography data set at each data location using any of the many methods for interpolating a data set known in the art.

In yet another specific example of implementation, each biopsy data set is computed using a transformed data set obtained by applying a data transform the cardiac tomography data set. Then, any suitable method, such as for example methods similar to the above-described methods are used to compute a biopsy data set from the transformed data set.

The computing of an exact model of the surface of interest on a basis of the plurality of biopsy data sets is performed at step 340, as described herein below. The exact model of the surface of interest includes a plurality of surface coordinate tri-dimensional vectors and is representative of the surface of interest. The exact model of the surface of interest is computed by expanding locally the approximative model of the surface of interest in directions defined by the plurality of normal vectors.

In an example of implementation, the biopsy data sets are computed from a transformed data set obtained by computing a laplacian of the cardiac tomography data set. In this example, the exact model of the surface of interest includes a plurality of surface coordinates tri-dimensional vectors at which the laplacian of the cardiac tomography data set is substantially equal to zero. In some embodiments of the invention, the laplacian is a three-dimensional laplacian.

In a related example of implementation, the biopsy data sets are computed from a transformed data set including a multiresolution data set from obtained from the cardiac tomography data set. The biopsy data sets are computed from a multiresolution laplacian data set obtained from said cardiac tomography data set by computing a plurality of laplacians of the cardiac tomography data set each taken at a predetermined resolution. In some embodiments of the invention, the laplacian is a three-dimensional laplacian.

Then, in a specific embodiment of the invention, each of the biopsy data set is representative the variance of the multiresolution laplacian data set at a plurality of voxels oriented in a direction defined by a respective normal vector selected from the plurality of normal vectors and including the surface coordinate associated with the respective normal vector.

An example of a optimisation criteria that may be used with the biopsy data sets computed using the method outlined in the preceding paragraph is a minimisation of the variance of the multiresolution laplacian data set. In other words, the exact model of the surface of interest includes a plurality of surface coordinates tri-dimensional vectors at which the variance of the multiresolution laplacian data set is substantially minimal.

The number of resolutions used in this method depends on the exact nature of the cardiac tomography data set and is generally comprised between 2 and 6. However, it is within the scope of the claimed invention use any other suitable number of resolutions. Also, the resolutions used for a specific cardiac tomography data set depend on many factors, such as the imaging apparatus used to acquire the data set, image acquisition parameters and pre-filtering performed by the imaging apparatus, among others. The reader skilled in the art will readily appreciate how to select the number and value of the of resolutions according to the processed cardiac tomography data set.

While the above-described examples refer to the surface of interest that itself enclose a volume of interest, the reader skilled in the art will readily appreciate that at least some of these methods are also suitable to compute only a portion of the surface of interest.

In yet another example of implementation, the cardiac tomography data set includes a plurality of voxels, each voxel including a respective tri-dimensional position, a respective time stamp and a respective intensity value. Then, the steps of providing a region of interest including a plurality of voxels selected from the cardiac tomography data set; computing an approximative model of the surface of interest on a basis of the region of interest using a non-parametric method; computing a plurality of normal vectors; computing a plurality of biopsy data sets; and computing an exact model of the surface of interest on a basis of the plurality of biopsy data sets are performed for a plurality of simultaneously acquired sets of voxels, each of the simultaneously acquired sets of voxels including all the voxels from the cardiac tomography data set having a substantially identical time stamp. Computing an exact model of the surface of interest produces a plurality of simultaneous models of the surface of interest, each simultaneous model of the surface of interest being an exact model of the surface of interest computed from a respective simultaneously acquired sets of voxels.

In yet another specific example of implementation, the local expansion of the approximative model of the surface of interest is performed using a gradient method, such as a modified local Germano-type method, similar to the Germano-type method described in Van Kriekinge et al., cited previously. As mentioned herein above, in the Germano-type method, each biopsy data set is numerically differentiated once and twice to provide respective first and second derivatives data sets. Similarly, in the modified local Germano-type method, each biopsy data set is numerically differentiated once and twice to provide respective first and second derivatives data sets. The surface of the cardiac chamber of interest is located on a given profile at a location close to a minimum of the first derivative data set. However, in opposition to the Germano-type method, the modified Germano-type method uses biopsy data sets obtained from voxels locally perpendicular to the surface of the cavity of interest. Since methods for identifying suitable minima in derivative data sets used by Germano-type methods are well known in the art, they will not be detailed herein.

In a very specific example of implementation, the exact model of the surface of interest is computed as follows from the minima of the first derivative data sets and subsequent local maxima of the second derivative data sets. A parameter designed as alpha is used. Alpha represents a normalized linear interpolation of a position and is common to all the first and second derivative data sets. More specifically, alpha takes a value of zero at all the minima of the first derivative data sets and a value of one at all the subsequent local maxima of the second derivative data sets. Intermediate values of alpha are obtained by linear interpolation such that, for example, a point located at midpoint between the minimum of a certain first derivative data sets and a subsequent local maximums of the second derivative data sets derived from the certain first derivative data set is designed by a value of alpha of one half.

To compute the exact model of the surface of interest, the value of alpha is adjusted globally for all the biopsy data sets to satisfy a consistency criterion. In a very specific example of implementation, alpha is selected such that a count-based evaluation of an ejection fraction related to the cavity of interest assumes a predetermined relationship with a voxel-based evaluation of an ejection fraction related to the cavity of interest. In other words, alpha is varied until the ejection fraction evaluated from the exact modelled surface and computed using two different methods satisfies the predetermined relationship. For example, the predetermined relationship might be that the voxel-based ejection fraction evaluation is a predetermined fraction of count-based ejection fraction evaluation. The fraction can assume a unity value, among others The geometry module 230 computes and outputs to the output 130 the geometric parameter. The geometric parameter is computed on a basis of at least one surface coordinate from the plurality of surface coordinates included in the exact model of the surface of interest.

Many geometric parameters are computable from the model of the surface of interest. For example, a volume of the cardiac chamber of interest can be computed by evaluating the volume contained within the model of the surface of interest. Algorithms to that effect are well known in the art and will therefore not be described in further details. If the volume of the cardiac chamber corresponding to an end of a systole and the volume of the cardiac chamber corresponding to an end of a diastole are known, an ejection fraction can be computed, once again using well-known methods. For these two parameters, a single output needs to be outputted.

In another example of implementation, the geometric parameter of interest is the model of the surface of interest itself. In these cases, the geometric module 230 can release either data to be visualized on a monitor in the output 130 or a plurality of surface coordinates to be saved on the storage medium 124 for future use.

In a further specific example of implementation, the geometric parameter includes a frequency analysis diagram, such as a Fourier analysis diagram, a discrete cosine transform (DCT) analysis diagram or a wavelet transform analysis diagram. In a very specific example of implementation, the geometric parameter includes a phase difference between a position on the surface of a first cardiac chamber and the corresponding position on the surface of a second cardiac chamber. In a further very specific example of implementation, the geometric parameter includes a pooled phase difference between positions on the surface of a first cardiac chamber and corresponding positions on the surface of a second cardiac chamber. In a further very specific example of implementation, the geometric parameter includes phase differences between parts of a unique cardiac chamber.

Figure 4:
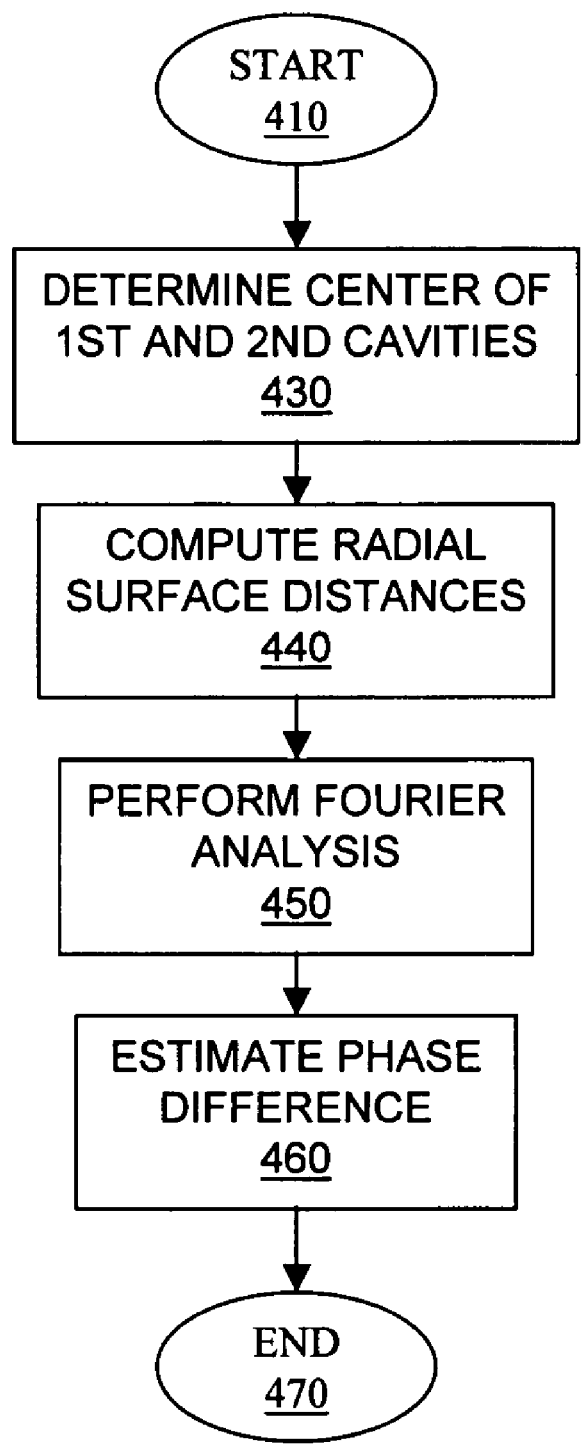
FIG. 4 is a flowchart illustrating a specific example of implementation of a method for performing a Fourier analysis, the Fourier analysis method being performed by a geometry module included in the program element of FIG. 2.

In a specific example of implementation, the method illustrated on FIG. 4 is used to produce a Fourier analysis diagram. The method requires an exact model of the surface of a first cardiac chamber and an exact model of the surface of a second cardiac chamber, each exact model including surface coordinates taken at a plurality of times corresponding to different phases in the cardiac cycle. Therefore, the input module 210 and the preprocessing module 220 process the cardiac tomography data set to obtain two time-dependent exact models.

The method starts at step 410. At step 430, a centre of each cardiac chamber is determined form the two exact models of surfaces of interest for each phase of the cardiac cycle. Subsequently, at step 440, distances between a centre of each exact model of surfaces and a plurality of locations on each exact model of surfaces are computed. At step 450, for each location, a Fourier analysis is performed to obtain a phase and an amplitude of an harmonic. In a very specific example of implementation, only the first harmonic is retained for output. Alternatively, more than one harmonics are retained. For example, retaining three harmonics might give better results in some applications. By pooling the data corresponding to all the locations, at step 460, an estimate in the phase difference in the contraction between the two cardiac chambers can be determined to be outputted by the geometry module 230. The method ends at step 470.

In specific examples of implementation, the Fourier analysis is used for classifying patients as good or bad candidates for the implantation of a bi-electrode pacemaker. Alternatively, the Fourier analysis is used for adjusting a delay between a stimulation of a left and a right ventricles by a bi-electrode pacemaker implanted in a patient. In yet another alternative, the Fourier analysis is used to determine that only one electrode in a bi-electrode pacemaker is required to properly stimulate a heart. For example, a bi-electrode stimulation might not improve a synchronization in the contraction of two cardiac chambers, rendering unnecessary a bi-electrode stimulation.

Although the present invention has been described hereinabove by way of preferred embodiments thereof, it can be modified, without departing from the spirit and nature of the subject invention as defined in the appended claims.

REFERENCES

Van Kriekinge et al., "Automatic quantification of left ventricular ejection fraction from gated blood pool SPECT", Journal of Nuclear Cardiology, 1999, Vol. 6, pp 498-506.

U.S. Pat. No. 6,389,310 issued to Demonceau et al. on May 14, 2002 and titled "Method and apparatus for analyzing heart function using 4D ECG synchronized heart cavity tomoscintigraphy".

What is claimed is:

1. A method for extracting a geometric parameter from a cardiac tomography data set, said method comprising the steps of:

providing a cardiac tomography data set including a plurality of voxels, each voxel including a respective tri-dimensional position vector and a respective intensity value;

providing a region of interest including a plurality of voxels selected from the cardiac tomography data set, the region of interest including at least in part voxels from the cardiac tomography data set representative of a cardiac chamber of interest, the cardiac chamber of interest having a surface of interest;

computing an approximative model of the surface of interest on a basis of the region of interest using a non-parametric method, the approximative model of the surface of interest including a plurality of surface coordinates tri-dimensional vectors;

computing a plurality of normal vectors, each normal vector being associated with a respective surface coordinate from the approximative model of the surface of interest;

computing a plurality of biopsy data sets, each biopsy data set including a plurality of data points, each biopsy data set being representative of a plurality of voxels oriented in a direction defined by a respective normal vector selected from the plurality of normal vectors and including the surface coordinate associated with the respective normal vector;

computing an exact model of at least a portion of the surface of interest on a basis of the plurality of biopsy data sets, the exact model of the portion of the surface of interest including a plurality of surface coordinates tri-dimensional vectors, the exact model of the portion of the surface of interest being computed by expanding locally the approximative model of the surface of interest in directions defined by the plurality of normal vectors; and computing the geometric parameter on a basis of at least one surface coordinate from the plurality of surface coordinates included in the exact model of the portion of the surface of interest.

2. A method as defined in claim 1, wherein said step of providing a cardiac tomography data set includes performing a coordinate system standardisation wherein the tri-dimensional position vector of each voxel is mapped to a standardised coordinate system.

3. A method as defined in claim 2, wherein the coordinate system standardisation is performed at least on a basis of a detection of the plane separating the atriums from the ventricles in the cardiac tomography data set.

4. A method as defined in claim 3, wherein in the standardised coordinate system, the plane separating the atriums from the ventricles includes an origin of the standardised coordinate system.

5. A method as defined in claim 1, wherein said step of providing a region of interest including a plurality of voxels selected from the cardiac tomography data set includes segmenting the cardiac tomography data set using a watershed method.

6. A method as defined in claim 1, wherein the approximative model of the surface of interest includes an isosurface computed from the cardiac tomography data set.

7. A method as defined in claim 6, wherein the isosurface substantially delimits a subset of the cardiac tomography data set including voxels having an intensity above a predetermined threshold and located within the cardiac chamber of interest.

8. A method as defined in claim 7, wherein the predetermined threshold is a predetermined fraction of the maximal intensity of all the voxels contained within the region of interest.

9. A method as defined in claim 8, wherein the predetermined fraction of the maximal intensity is from about 0.2 of the maximal intensity to about 0.5 of the maximal intensity.

10. A method as defined in claim 9, wherein the predetermined fraction of the maximal intensity is about 0.4 of the maximal intensity.

11. A method as defined in claim 1, wherein said step of computing an exact model of the surface of interest on a basis of the plurality of biopsy data sets includes applying a gradient method to each biopsy data set from the plurality of biopsy data sets.

12. A method as defined in claim 1, wherein:

said step of computing a plurality of biopsy data sets includes computing a laplacian of the cardiac tomography data set; and the exact model of the portion of the surface of interest including a plurality of surface coordinates tri-dimensional vectors at which the laplacian of the cardiac tomography data set is substantially equal to zero.

13. A method as defined in claim 1, wherein said step of computing a plurality of biopsy data sets includes computing a multiresolution data set from said cardiac tomography data set.

14. A method as defined in claim 13, wherein said step of computing a plurality of biopsy data sets includes computing a multiresolution laplacian data set from said cardiac tomography data set.

15. A method as defined in claim 14, wherein each of the biopsy data set is representative the variance of the multiresolution laplacian data set at a plurality of voxels oriented in a direction defined by a respective normal vector selected from the plurality of normal vectors and including the surface coordinate associated with the respective normal vector.

16. A method as defined in claim 15, wherein the exact model of the portion of the surface of interest including a plurality of surface coordinates tri-dimensional vectors at which the variance of the multiresolution laplacian data set is substantially minimal.

17. A method as defined in claim 1, wherein the portion of the surface of interest includes a surface enclosing completely a volume of interest.

18. A method as defined in claim 17, wherein said step of computing the geometric parameter includes computing an ejection fraction for the cardiac chamber of interest.

19. A method as defined in claim 17, wherein:
the cardiac tomography data set includes a plurality of voxels, each voxel including a respective tri-dimensional position, a respective time stamp and a respective intensity value;
said steps of providing a region of interest including a plurality of voxels selected from the cardiac tomography data set;
computing an approximative model of the surface of interest on a basis of the region of interest using a non-parametric method; computing a plurality of normal vectors; computing a plurality of biopsy data sets; and computing an exact model of the surface of interest on a basis of the plurality of biopsy data sets are performed for a plurality of simultaneously acquired sets of voxels, each of the simultaneously acquired sets of voxels including all the voxels from the cardiac tomography data set having a substantially identical time stamp; and
said step of computing an exact model of the surface of interest produces a plurality of simultaneous models of the surface of interest, each simultaneous model of the surface of interest being an exact model of the surface of interest computed from a respective simultaneously acquired sets of voxels.

20. A method as defined in claim 19, wherein said step of computing the geometric parameter includes performing a frequency-domain analysis of the plurality of simultaneous models of the surface of interest.

21. A method as defined in claim 20, wherein the geometric parameter includes an amplitude of a Fourier transform.

22. A method as defined in claim 20, wherein the geometric parameter includes a phase of a Fourier transform.

23. A method as defined in claim 20, wherein the geometric parameter includes a phase difference between the Fourier transforms of corresponding surface portions from two different cardiac chambers.

24. A method as defined in claim 23, wherein the geometric parameter includes a phase difference between the Fourier transforms of the coordinates of two different locations on the surface of interest.

25. A computer readable storage medium containing a computer program element when executed by a computing device for extracting a geometric parameter from a cardiac tomography data set, comprising: receiving:
i) a cardiac tomography data set including a plurality of voxels, each voxel including a respective tri-dimensional position vector and a respective intensity value; and
ii) a region of interest including a plurality of voxels selected from the cardiac tomography data set, the region of interest including at least in part voxels from the cardiac tomography data set representative of a cardiac chamber of interest, the cardiac chamber of interest having a surface of interest;
preprocessing by:
i) computing an approximative model of the surface of interest on a basis of the region of interest using a non-parametric method, the approximative model of the surface of interest including a plurality of surface coordinates tri-dimensional vectors;
ii) computing a plurality of normal vectors, each normal vector being associated with a respective surface coordinate from the approximative model of the surface of interest;
iii) computing a plurality of biopsy data sets, each biopsy data set including a plurality of data points, each biopsy data set being representative of a plurality of voxels oriented in a direction defined by a respective normal vector selected from the plurality of normal vectors and including the surface coordinate associated with the respective normal vector; and
iv) computing an exact model of the surface of interest on a basis of the plurality of biopsy data sets, the exact model of the surface of interest including a plurality of surface coordinates tri-dimensional vectors, the exact model of the surface of interest being computed by expanding locally the approximative model of the surface of interest in directions defined by the plurality of normal vectors; and
computing and outputting the geometric parameter on a basis of at least one surface coordinate from the plurality of surface coordinates included in the exact model of the surface of interest.

26. A cardiac tomograph, said cardiac tomograph comprising:
a tomography data acquisition system for acquiring a cardiac tomography data set including a plurality of voxels, each voxel including a respective tri-dimensional position vector and a respective intensity value;
a storage medium connected to said tomography data acquisition system; and
a computing device connected to said tomography data acquisition system and to said storage medium;
wherein said storage medium contains a program element for execution by said computing device, said program element being adapted to extract a geometric parameter from the cardiac tomography data set, comprising:
i) receiving:
(1) the cardiac tomography data set; and
(2) a region of interest including a plurality of voxels selected from the cardiac tomography data set, the region of interest including at least in part voxels from the cardiac tomography data set representative of a cardiac chamber of interest, the cardiac chamber of interest having a surface of interest;
ii) preprocessing by:
(1) computing an approximative model of the surface of interest on a basis of the region of interest using a non-parametric method, the approximative model of the surface of interest including a plurality of surface coordinates tri-dimensional vectors;
(2) computing a plurality of normal vectors, each normal vector being associated with a respective surface coordinate from the approximative model of the surface of interest;
(3) computing a plurality of biopsy data sets, each biopsy data set including a plurality of data points, each biopsy data set being representative of a plurality of voxels oriented in a direction defined by a respective normal vector selected from the plurality of normal vectors and including the surface coordinate associated with the respective normal vector; and
(4) computing an exact model of the surface of interest on a basis of the plurality of biopsy data sets, the exact model of the surface of interest including a plurality of surface coordinates tri-dimensional vectors, the exact model of the surface of interest being computed by expanding locally the approximative model of the surface of interest in directions defined by the plurality of normal vectors; and iii) computing and outputting the geometric parameter on a basis of at least one surface coordinate from the plurality of surface coordinates included in the exact model of the surface of interest.

27. A method for performing a segmentation of a multi-dimensional data set, said method comprising the steps of:

providing a multi-dimensional data set including a plurality of voxels, each voxel including a respective multi-dimensional position vector and a respective intensity value;

providing a region of interest including a plurality of voxels selected from the multi-dimensional data set, the region of interest defining a surface of interest;

computing an approximative model of the surface of interest on a basis of the region of interest using a non-parametric method, the approximative model of the surface of interest including a plurality of surface coordinates multi-dimensional vectors;

computing a plurality of normal vectors, each normal vector being associated with a respective surface coordinate from the approximative model of the surface of interest;

computing a plurality of biopsy data sets, each biopsy data set including a plurality of data points, each biopsy data set being representative of a plurality of voxels oriented in a direction defined by a respective normal vector selected from the plurality of normal vectors and including the surface coordinate associated with the respective normal vector, wherein computing a plurality of biopsy data sets includes computing a multiresolution laplacian data set from the multi-dimensional data set, each of the biopsy data set being representative of the variance of the multiresolution laplacian data set at a plurality of voxels oriented in a direction defined by a respective normal vector selected from the plurality of normal vectors and including the surface coordinate associated with the respective normal vector; and computing an exact model of at least a portion of the surface of interest on a basis of the plurality of biopsy data sets, the exact model of the portion of the surface of interest including a plurality of surface coordinates multi-dimensional vectors, the exact model of the portion of the surface of interest being computed by expanding locally the approximative model of the surface of interest in directions defined by the plurality of normal vectors, the exact model of the portion of the surface of interest including a plurality of surface coordinates multi-dimensional vectors at which the variance of the multiresolution laplacian data set is substantially minimal.

* * * * *